United States Patent
Ishii et al.

(10) Patent No.: US 7,559,601 B2
(45) Date of Patent: Jul. 14, 2009

(54) CONSTRUCTION MACHINE

(75) Inventors: Hajime Ishii, Youkaichi (JP); Masayuki Yunoue, Shiga (JP); Shigeru Hirasawa, Ritto (JP); Hiroshi Tabeta, Shiga (JP); Shogo Kimura, Ritto (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 413 days.

(21) Appl. No.: 10/547,573

(22) PCT Filed: Feb. 25, 2004

(86) PCT No.: PCT/JP2004/002176

§ 371 (c)(1),
(2), (4) Date: Aug. 31, 2005

(87) PCT Pub. No.: WO2004/078562

PCT Pub. Date: Sep. 16, 2004

(65) Prior Publication Data

US 2006/0170251 A1    Aug. 3, 2006

(30) Foreign Application Priority Data

Mar. 4, 2003  (JP) .............................. 2003-057672

(51) Int. Cl.
*B62D 33/06*  (2006.01)
*B62D 25/20*  (2006.01)

(52) U.S. Cl. .......................... 296/190.08; 296/193.07; 296/193.05; 180/89.13

(58) Field of Classification Search .............. 296/37.14, 296/197.07, 204, 75, 190.09, 25, 190.08, 296/193.07, 193.05; 180/89.13
See application file for complete search history.

(56) References Cited

U.S. PATENT DOCUMENTS

| | | | | |
|---|---|---|---|---|
| 1,107,057 A | * | 8/1914 | Gilmore | 296/37.14 |
| 1,421,732 A | * | 7/1922 | Slack | 296/37.14 |
| 1,771,813 A | * | 7/1930 | Norman | 280/87.01 |
| 2,797,957 A | * | 7/1957 | North | 296/37.14 |
| 3,287,058 A | * | 11/1966 | Wells | 296/37.14 |
| 4,423,900 A | * | 1/1984 | Sugimoto et al. | 296/37.14 |
| 5,308,279 A | * | 5/1994 | Grinberg | 454/139 |
| 6,145,907 A | * | 11/2000 | Maruyama et al. | 296/37.14 |
| 6,155,632 A | * | 12/2000 | Fujimoto | 296/190.08 |
| 6,921,129 B2 | * | 7/2005 | Katz et al. | 296/193.07 |

FOREIGN PATENT DOCUMENTS

| | | |
|---|---|---|
| JP | 2561547 | 10/1997 |
| JP | 11-334351 | 12/1999 |
| JP | 2001-138957 A | 5/2001 |

* cited by examiner

*Primary Examiner*—Dennis H Pedder
*Assistant Examiner*—Melissa A Black
(74) *Attorney, Agent, or Firm*—Mattingly & Malur, P.C.

(57) ABSTRACT

A lower floor panel (20) and an upper floor panel (22) which is having a sunken storage portion (20D) is provided in front of a seat supporting base (12) which supports an operator's seat (16) with in a cab (11). A storage space (24) is provided between a sunken storage portion (20D) in the lower floor panel (20) and a flat horizontal surface (22A) of the upper floor panel (22). This storage space (24) can be used for installation of an air-conditioning unit (25). This lo means that the air-conditioning unit (25) can be accommodated in a floor portion in front of the operator's seat (16), permitting to suppress the height of the cab (11) to an appropriate level. In addition, installation of the air-conditioning unit (25) can make assembling and maintenance work far easier.

5 Claims, 13 Drawing Sheets

CONSTRUCTION MACHINE

TECHNICAL FIELD

This invention relates to a construction machine, and more particularly to a construction machine, for example, like a hydraulic type excavator or a hydraulic crane which is furnished with an operator's seat to be occupied by an operator.

BACKGROUND ART

Generally, a hydraulic excavator and hydraulic crane are widely known as a construction machine. In the case of the hydraulic excavator, for example, the construction machine is largely constituted by an automotive lower structure or vehicle, an upper revolving structure rotatably mounted on the automotive lower structure, and a working mechanism provided on a front side section of the upper revolving structure, for example, for up and down motions.

The upper revolving structure is provided with a revolving frame as its base, and an engine is mounted on the revolving frame along with an operator's seat. A floor panel is laid on the front side of the operator's seat, and vehicle control pedals and levers are provided with a front side section of the floor panel.

Some hydraulic excavators are furnished with a cab in such a way as to enclose the operator's seat. The cab-furnished type hydraulic excavators are often provided with an air conditioner to improve the working environment within the cab by supplying conditioned air like cool air or warm air.

On the other hand, hydraulic excavators have a class of small-size power shovels which are generally referred to as "mini power shovels." A cab to be furnished on a mini power shovel is formed in a smaller size in conformity with the small machine size, and in such a case, for example an operator's seat is located over an engine to effectively utilize limited spaces within the cab.

Further, in the case of a cab on a small-size excavator, its inner space is too limited to find a place for installation of an air-conditioning unit. In order to solve this problem, attempts have thus far been made to accommodate an indoor air-conditioning unit of an air conditioning system in the ceiling of a cab (e.g., as proposed in Japanese Patent Laid-Open No. H11-334351).

By an air conditioning system, intake air is conditioned and conditioned air is blown into a cab from an indoor air conditioning unit thereby to keep the temperature within the cab at an adjusted comfortable level for the operator.

In this connection, in the case of the small-size excavator by the above-mentioned prior art, a compartment is provided in the ceiling to accommodate an air-conditioning unit. This necessarily results in a unignorable increase in cab ceiling height and in an undesirable increase in total height of the excavator.

The increase in total height of an excavator invites various problems, For example, in some cases it becomes necessary to dismantle the cab from the lower structure to put the excavator in a transport container, and to ship the cab separately from other parts of the machine. Further, one may face difficulties in putting the excavator into a garage.

The air conditioning system is composed of an indoor or internal air-conditioning unit, and outdoor or external units such as compressor and condenser. The outdoor units like compressor and condenser are usually mounted on the side of the engine of the vehicle body, and a coolant is circulated between the indoor and outdoor units through pipes.

Therefore, it is often found difficult to charge a coolant during a shipment of an excavator because the internal air-conditioning unit in the ceiling of the cab is disconnected from the compressor of the external unit, and this makes the assembling work very inefficiently. In addition, the coolant of the air-conditioning system has to be extracted prior to disconnecting pipes, at the time of dismantling the cab for the purpose of maintenance and service or for other reasons. This makes the maintenance work very inefficient and troublesome.

DISCLOSURE OF THE INVENTION

In view of the above-discussed problems with the prior art, it is an object of the present invention to provide a construction machine which is provided with a storage space within a floor panel of a vehicular body for installation of an air-conditioning unit or other equipments, in such a way as to facilitate assembling and maintenance and service of the machine.

According to the present invention, the construction machine having an automotive vehicular body provided a working machine, an operator's seat provided on the said vehicular body which is to be seated by an operator and a floor panel located in front of said operator's seat.

In order to solve the above-discussed problems, the construction machine according to the present invention comprises: the floor panel of a double panel construction composed of a lower floor panel having a flat horizontal surface and sunken storage portion in part of the flat horizontal surface, and an upper floor panel located over the lower floor panel in such a way as to cover the sunken storage portion, and a storage space is provided between the sunken storage portion of the lower floor panel and the upper floor panel for storing equipments or articles which are needed for the machine.

With the arrangements just described, a storage space which has never been utilized as a storage space is provided within a floor panel on the front side of an operator's seat. Therefore, it becomes possible to provide a storage space, for example, for installation of an air-conditioning unit or for storage of working tools, even on small-size construction machines which scarcely have extra storage spaces.

In addition, the upper floor panel is arranged to cover articles which are stored in the storage space. Accordingly, simply by removing the upper floor panel, one can make maintenance work and put articles into or out of the storage space easily in an efficient manner.

On the other hand, the lower floor panel which is formed into a stereostructure by the provision of the sunken storage portion is increased in strength and can prevent resonances. Besides, the floor panel of double panel construction, composed of an upper floor panel member and a lower floor panel member, is effective in maintaining a comfortable working environment by shutting off operating noises and heat which are generated by equipments located under the floor panel.

In a preferred form of the present invention, the storage space in the floor panel is tailored to accommodate an air-conditioning unit which supplies conditioned air. In this case, even for a cab furnished type small-size excavator which is difficult to install the air-conditioning unit, thanks to the storage space in the floor panel, it becomes possible to install the air-conditioning unit, suppressing increases in cab height. This means that a cab type hydraulic excavator can be put in a transport container without detaching a cab and shipped in an efficient manner.

According to another preferred form of the present invention, the storage space in the floor panel is tailored to store tools to be attached to the working mechanism. In this case, even on a small-size hydraulic excavator, it becomes possible to store on-vehicle tools and substitute working tools of the working mechanism in the storage space in the floor panel, and one can carry out a maintenance work and replacement of a working tool in an efficient manner.

Further, according to the present invention, an air-conditioning unit which supplies conditioned air is installed in the storage space with upper portions of the air-conditioning unit projected above the flat horizontal surface of the lower floor panel and said upper floor panel is set with a space between said flat horizontal surface of said lower floor panel and said upper floor for covering the projected portion of said air-conditioning unit. In this case, an air-conditioning unit can be accommodated in the sunken storage portion of the lower floor panel substantially halfway of its height and its upper portion is projected above the flat horizontal surface of the lower floor panel. Therefore, the sunken storage portion suffices to be a shallow and to avoid interference with other equipments and components which are located under the floor panel. Besides, even when a cab is removed from the vehicular body, the air-conditioning unit in the floor panel is still connected to outdoor units of the air-conditioning system (such as compressor and condenser) which are located on the side of the engine. Besides, piping work between the air-conditioning unit and outdoor units as well as charging of a coolant can be carried out in a very efficient manner, before setting a cab on the vehicular body.

According to still another preferred form of the present invention, the flat horizontal surface and sunken storage portion of the lower floor panel are integrally formed on a single plate material. Accordingly, it becomes possible to fabricate the lower floor panel from a reduced number of parts and with a higher productivity.

Further, according to another preferred form of the present invention, the lower floor panel is composed of a lower floor panel member with a case receptacle opening, and a case member formed separately of the lower floor panel member and adapted to fit in the case receptacle opening to form a sunken storage portion in the lower floor panel member. In this case, a sunken storage portion can be formed more easily in the case member which is provided separately of the lower floor panel member. It follows that the lower floor panel member can be fabricated with higher productivity and at a reduced production cost. In addition, depending upon the nature of articles to be stored in the storage space in the lower floor panel member, a suitable case can be selected from a number of cases of different customized shapes for the purpose of installing equipments or storing articles of different shapes in the storage space of the floor panel efficiently in a stabilized state.

In this respect, according to the present invention, the case member of the lower floor panel is at least selectable from an air-conditioning unit case member tailored particularly for use at the time of installing said air-conditioning unit in the storage space of the floor panel and a tool case member tailored particularly for use at the time of storing working tools of the working mechanism of the machine in the storage space in the floor panel. Thus, either the air-conditioning unit case member or the tool case member can be selectively set in the case receptacle opening in the lower floor panel member. In this case, in order to facilitate installation of an air-conditioning unit in the storage space of the floor panel, the air-conditioning unit case member to be set in the case receptacle opening in the lower flower panel member is formed in a shape conforming with the outer configuration of the air-conditioning unit and tailored to provide a passage for pipes and cables to be routed and connected to outdoor units of the air-conditioning system. On the other hand, at the time of storing working tools in the storage space of the floor panel, the tool case member to be set in the case receptacle opening in the lower floor panel member suffice to have a sunken storage portion of a simple box-like shape.

Further, according to the present invention, the case member of the lower floor panel is detachably attached to the lower floor panel member by means of bolts, and removed from the lower floor panel member to permit access through the case receptacle opening to equipments located under the lower floor panel member at the time for inspection or maintenance and service thereof.

BEST MODE FOR CARRYING OUT THE INVENTION

Hereafter, with reference to the accompanying drawings, the present invention is described more particularly by way of its preferred embodiments which are applied especially to a small-size hydraulic excavator or so-called "mini power shovel" among various construction machines to which the present invention is applicable.

Referring to FIGS. 1 through 6, there is shown a first embodiment of the present invention. In the first embodiment, the present invention is applied to a cab-equipped small-size hydraulic excavator having an operator's seat enclosed in a cab box with an air-conditioning system for conditioning air in the cab box.

Figure 1:
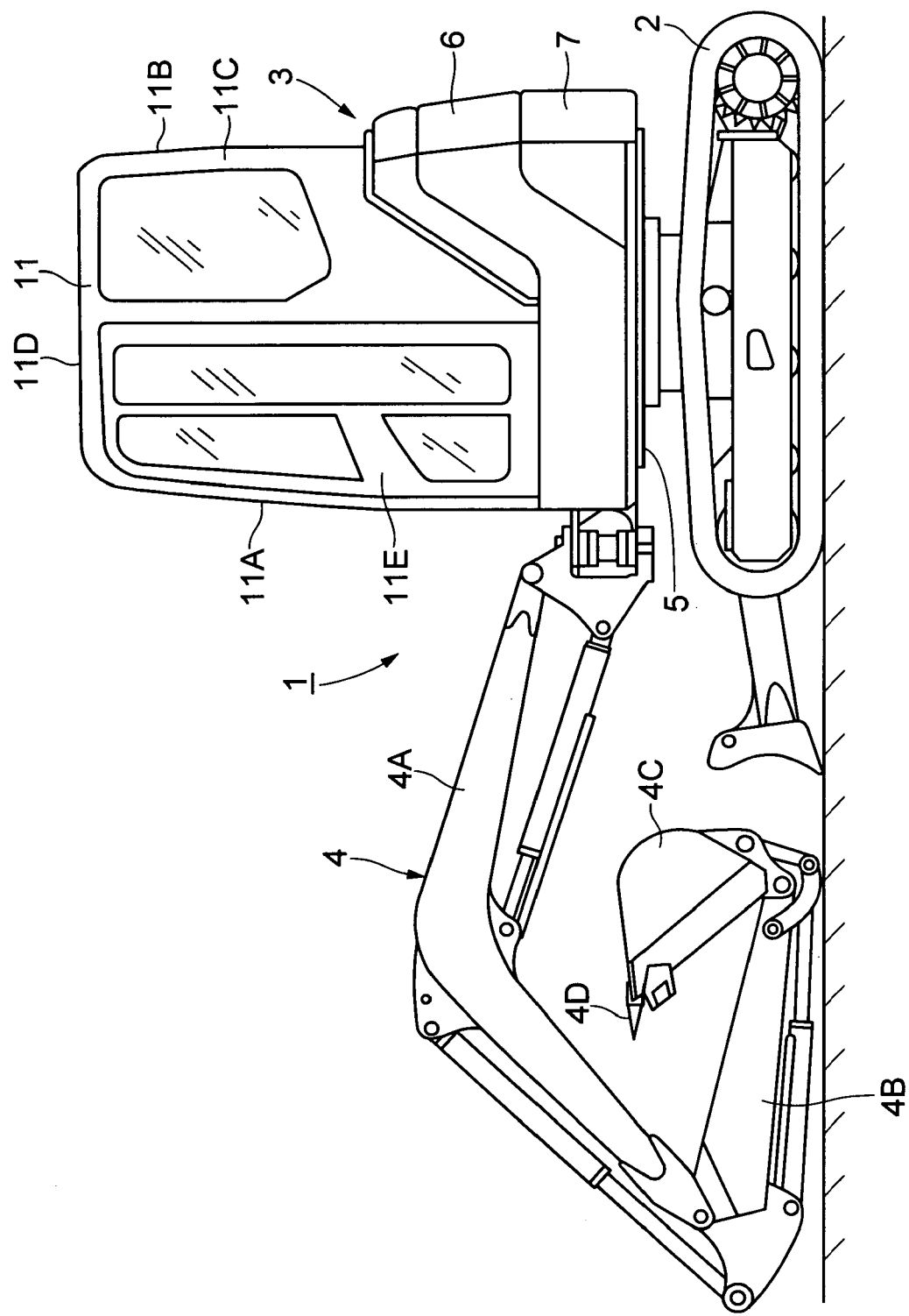
FIG. 1 is a front view of a cab-furnished small-size hydraulic excavator to which a first embodiment of the present invention is applied.

In FIG. 1, indicated at 1 is a cab-furnished type hydraulic excavator adopted in the first embodiment as an example of construction machines to which the present invention is applicable. The hydraulic excavator 1 is largely constituted by an automotive lower structure 2, an upper revolving structure 3 which is rotatably mounted on and assembled with the automotive lower structure 2 to a vehicle body structure together with the latter, and a working mechanism 4 liftably mounted on the front side of the upper revolving structure 3 for ground digging or excavating operations.

The upper revolving structure 3 is largely constituted by a revolving frame 5 which is formed, for example, by the use of a thick steel plate, an engine and a hydraulic pump (both not shown in the drawings) which are mounted behind the revolving frame 5, a decorative cover 6 extending from right side to rear side of the revolving frame 5 to cover said engine along with operating oil tank, radiator, oil cooler (none of which is shown in the drawings), a counterweight 7 which is attached to the rear end of the revolving frame 5, a cab 11 which is provided on the left side of the revolving frame 5 as described in greater detail hereinafter, an operator's seat 16, floor panels 20 and 22, and an air-conditioning unit 25.

On the other hand, the working mechanism 4 is largely constituted by a boom 4A which is liftably provided on a front portion of the revolving frame 5, an arm 4B which is pivotally connected to a fore end portion of the boom 4A, and a bucket 4C which is pivotally supported at a fore distal end of the arm 4B. Further, a plural number of excavating claws 4D are detachably attached on the bucket 4C (only one of the excavating claws 4D is shown in FIG. 1).

Next, indicated at 11 is a cab which is provided on the left side of the revolving frame 5. This cab 11 is arranged to enclose an operator's seat 16, which will be described hereinafter, to define a cabin room in which an operator can manipulate various control levers and buttons of the machine. The cab 11 is formed in a box-like shape including a front section 11A, a rear section 11B, a left side section 11C, a right side section (not shown), and a roof section 11D. A door 11E is fitted to be able to open and close in a front side of the left side section 11C.

Figure 2:
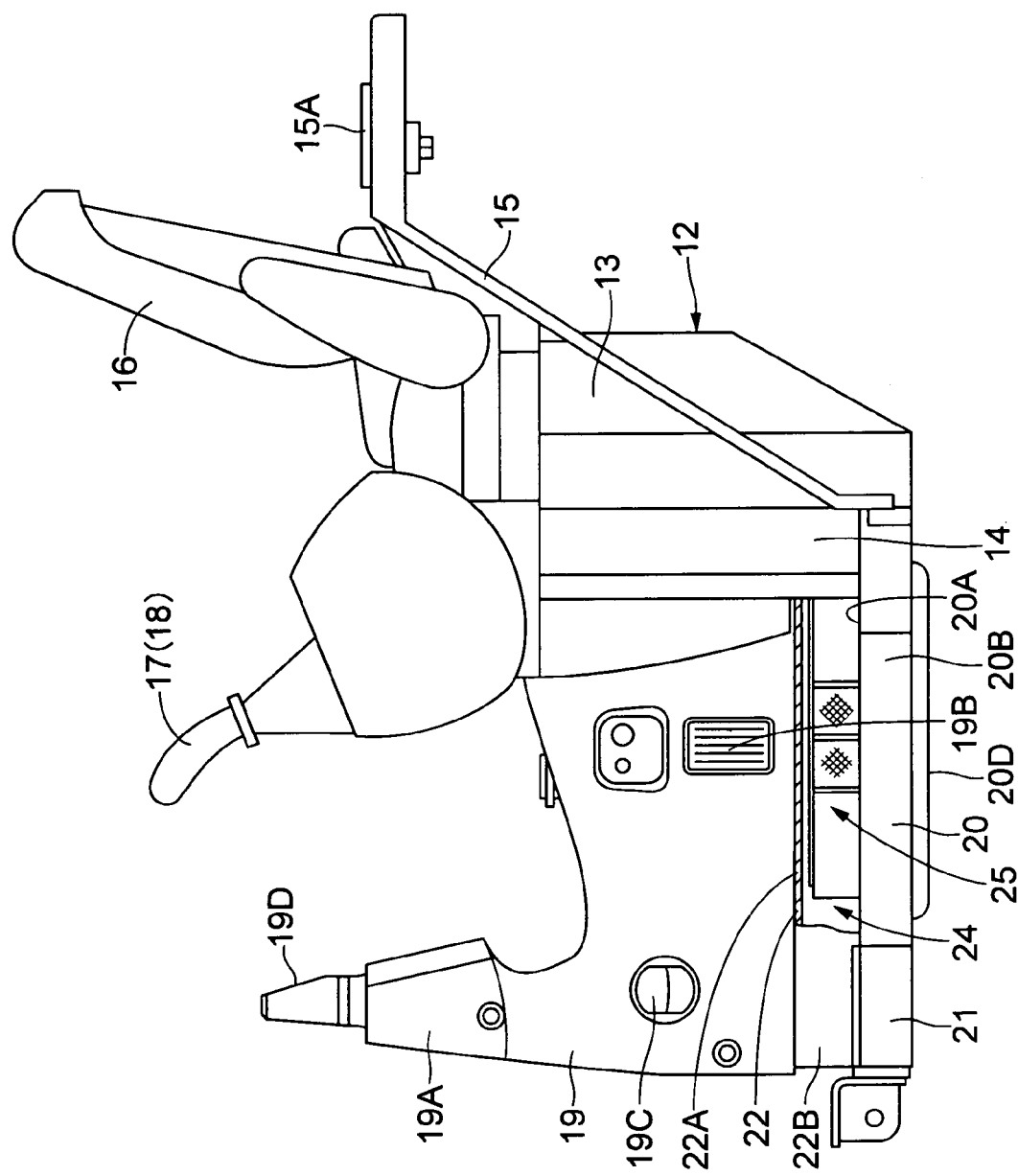
FIG. 2 is a partly cutaway front view of a cab box, showing layouts of equipments around an operator's seat and an internal air-conditioning unit within the cab box.
Figure 3:
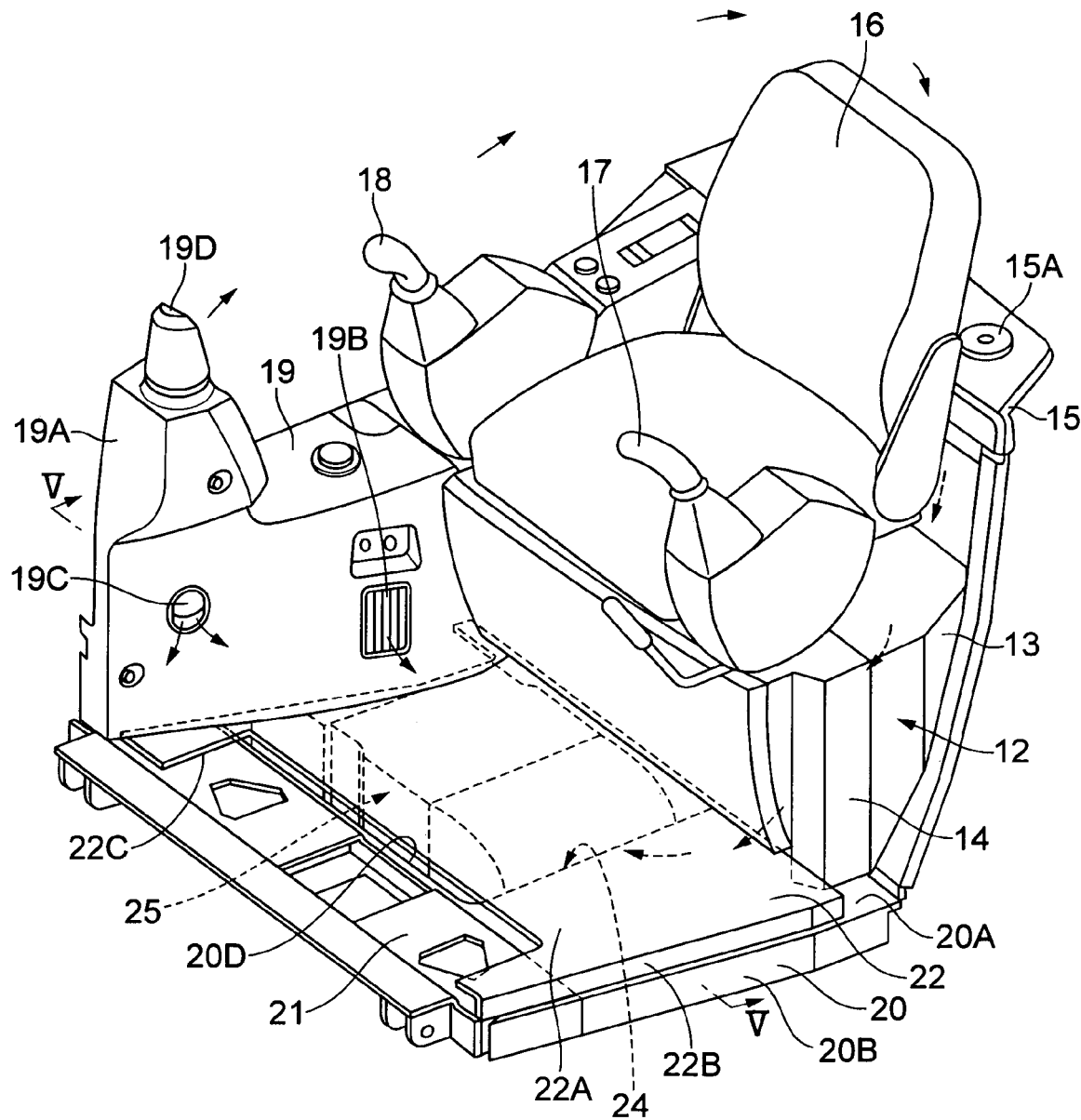
FIG. 3 is a perspective view of equipments around the operator's seat and the air-conditioning unit within the cab box.
Figure 4:
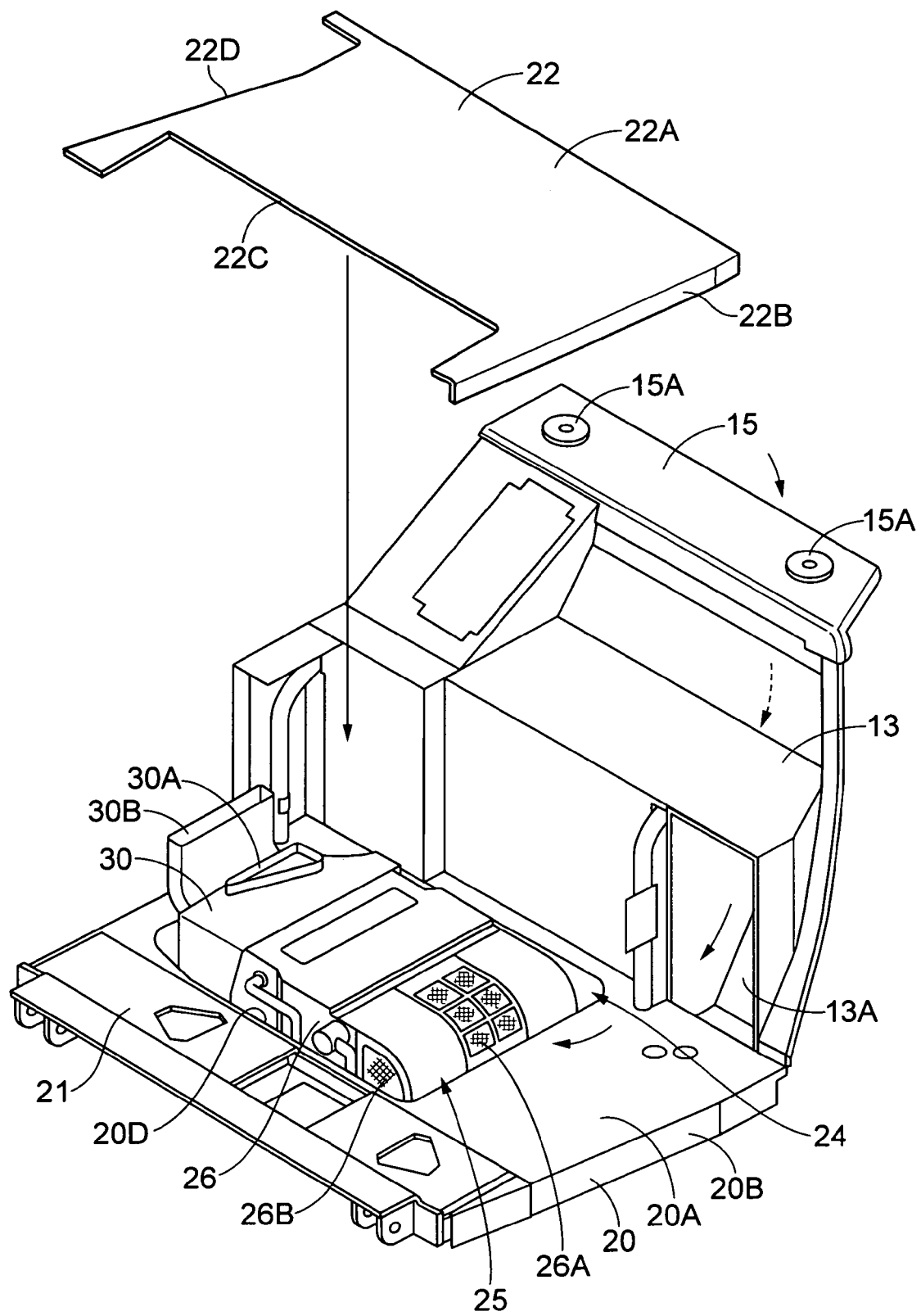
FIG. 4 is a perspective view similar to FIG. 3 except that an upper floor panel is removed to show a lower floor panel and air-conditioning unit in an exposed state.

Denoted at 12 is a seat supporting base which is provided on a rear side portion of the revolving frame 5 in such a way as to close a rear floor portion of the cab 11. As shown in FIGS. 2 to 4, the seat supporting base 12 is largely constituted by a step-like rear base plate 13 which is fixedly provided on the rear side, a front base plate 14 which is detachably attached to the front side of the rear base plate 13, and a back plate 15 which is extended in a rearward direction from the rear base plate 13.

In this instance, the rear base plate 13 and the front base plate 14 are provided to support the operator's seat 16 which will be described hereinafter, while the rear base plate 13 and the back plate 15 are also utilized as a front engine cover which covers front side and part of upper side of an engine. Further, the front base plate 14 can be detached from the rear base plate 13 and removed at the time of mounting or dismantling an air-conditioning unit 25 or when there arises a necessity for making an access to the air-conditioning unit for maintenance and service or for other purposes. Furthermore, mount members 15A are attached on the back plate 15. An air passage opening 13A is provided on the left side of the rear base plate 13 to return conditioned air, which is blown out through a rearward air outlet 19D in a duct cover 19, which will be described hereinafter, toward the air-conditioning unit 25 via the rear side of the operator's seat 16.

Indicated at 16 is the operator's seat which is provided on the seat supporting base 12 and which is to be occupied by an operator. Operation control levers 17 and 18 are provided on the left side and right side of operator's seat 16 for controlling operations of the working mechanism 4.

Denoted at 19 is a duct cover which is provided in a right side section of the cab 11 and extended forward alongside the operator's seat 16. The duct cover 19 is provided for covering air-conditioner ducts (not shown) which supply conditioned air. A monitor screen mount box 19A is provided integrally and projected upward at the front end of the duct cover 19. A monitor screen (not shown) is fitted on the rear side of the monitor screen mount box 19A to indicate operating conditions and other information of the machine to an operator.

On a lateral side of the duct cover 19, a foot side air outlet 19B is provided at a low rear position to supply conditioned air toward operator's feet, and a forward air outlet 19C is provided at a front position to supply conditioned air toward the front section 11A of the cab 11. Further, a rearward air outlet 19D is provided on the monitor screen mount box 19A of the duct cover 19 to supply conditioned air in a rearward direction toward an operator who is seated on the operator's seat 16. The foot side air outlet 19B is connected to a foot side air discharge port 30A of an air discharge duct 30 of the air-conditioning unit 25. The forward air outlet 19C and the rearward air outlet 19D are connected to a front side air discharge port 30B of the air discharge duct 30 of the air-conditioning unit 25, which will be described hereinafter.

Figure 5:
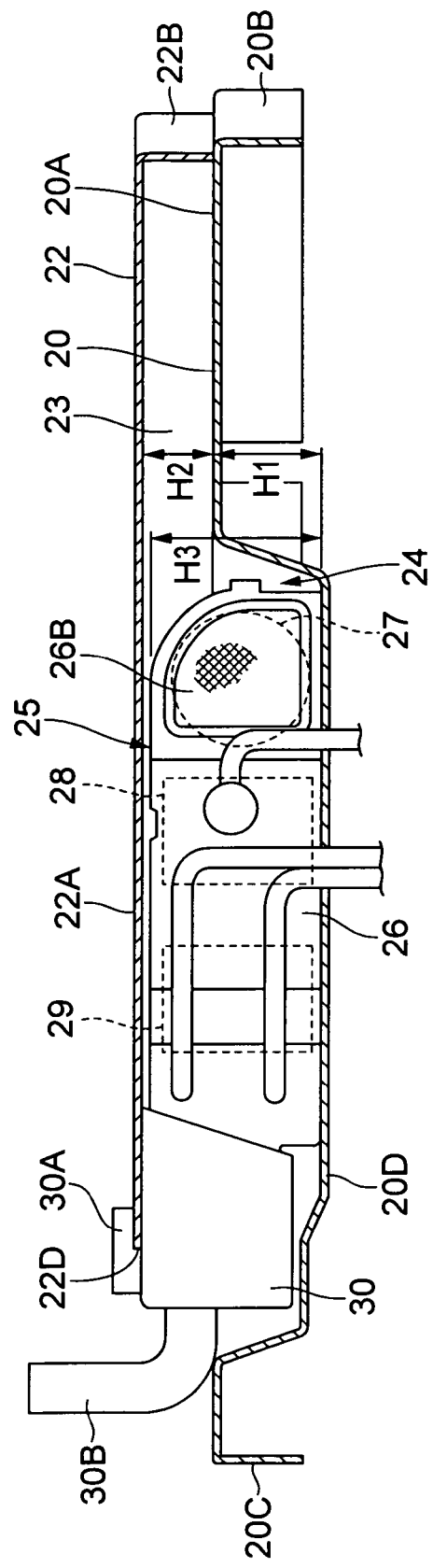
FIG. 5 is a sectional view of the air-conditioning unit taken in the direction of arrows V-V in FIG. 3.

Indicated at 20 is a lower floor panel which is located on the front side of the operator's seat 16. As shown in FIGS. 3 and 5, the lower floor panel 20 is employed as a lower layer of a double panel floor construction which is fabricated along with the upper floor panel 22 as will be described hereinafter. Further, the rear end portion of the lower floor panel 20 is fixed to the fore end of the rear base plate 13 by means of bolts or by welding or other suitable fixation means. On the other hand, a lever/pedal mount plate 21 is fixed to the fore end of the lower floor panel 20 for mounting vehicle operating levers and pedals (not shown).

Figure 6:
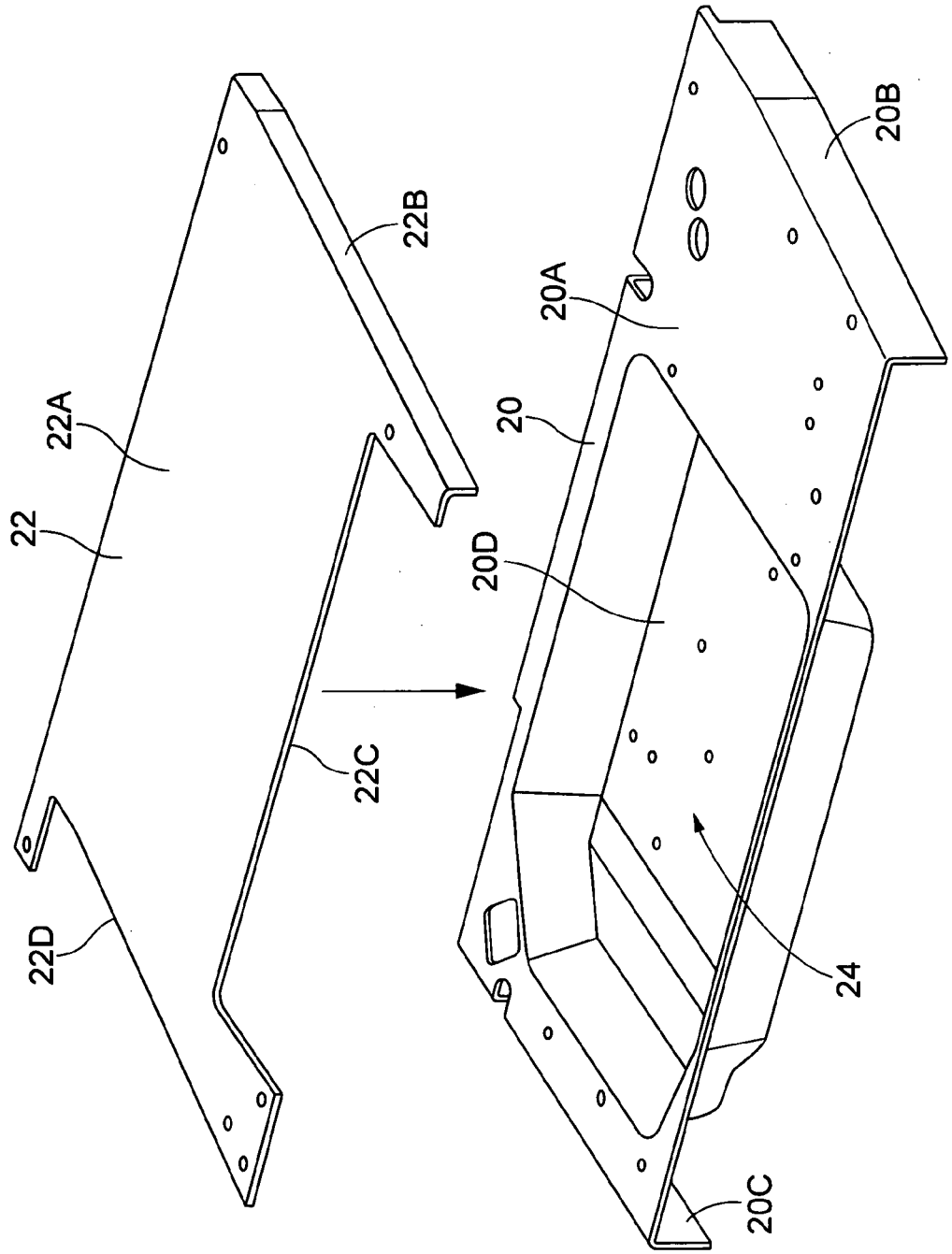
FIG. 6 is an exploded perspective view of upper and lower floor panels in a separated state.

As shown in FIGS. 4 and 6, the lower floor panel 20 is constituted by a transversely extending flat horizontal surface 20A, bent end walls 20B and 20C which are formed by downwardly bending right and left end portions of the flat horizontal surface 20A, and a sunken storage portion 20D which is provided close to the right end of the flat horizontal surface 20A to form part of a storage space 24 which will be described hereinafter. In this manner, the flat horizontal surface 20A, downward bent end walls 20B and 20C and sunken storage portion. 20D of the lower floor panel 20 are formed integrally in and out of one and single plate material.

In this instance, the sunken storage portion 20D is in the form of a bottomed rectangular box with its longer sides extended in the transverse direction of the cab, and formed into the lower floor panel 20 integrally with the flat horizontal surface 20A, for example, by a drawing operation. Further, the sunken storage portion 20D is arranged to have a depth H1 which is approximately in the range of 50 to 80%, more preferably, in the range of 60 to 70% of height H3 of an air-conditioning unit 25 which will be described hereinafter. Namely, the sunken storage portion 20D is formed in a size which will not interfere with the revolving frame 5 and control valves (not shown) which are located beneath the lower floor panel 20. Further, the provision of the sunken storage portion 20D contributes to enhance the rigidity of the lower floor panel 20 by forming same into a stereostructure.

Indicated at 22 is an upper floor panel which is provided on the upper side of the lower floor panel 20 to cover the sunken storage portion 20D (the air-conditioning unit 25 which will be described hereinafter). As shown in FIG. 6, the upper floor panel 22 is formed as a flat panel in its entirety, and largely constituted by a flat horizontal surface 22A which defines the storage space 24 together with the sunken storage portion 20D, and a narrow end wall 22B which is formed by downwardly bending a marginal end portion at the left end of the flat horizontal surface 22A. Further, the front side of the flat horizontal surface 22A is indented by the provision of a recess 22C which extends in the transverse direction. Further, an inclined recess 22D is provided along the right side of the flat horizontal surface 22A to evade a foot side air discharge port 30A of the air discharge duct 30 which will be described hereinafter.

The upper floor panel 22 is detachably fixed to the top side of the lower floor panel 20, for example, by means of bolts. Accordingly, the upper floor panel 22, which forms a floor panel of a double panel construction along with the lower floor panel 20, serves to prevent, for example, operational noises and heat of control valves from leaking into the cab 11. In addition, upon removing bolts, the upper floor panel 22 can be easily lifted up, for example, at the time of cleaning or replacing air filters 26A and 26B which are fitted in a main case 26 of the air-conditioning unit 25.

In this instance, the flat horizontal surface 22A of the upper floor panel 22 is spaced from the flat horizontal surface 20A of the lower floor panel 20 by a height H2. This height H2 (i.e., a width of spacing) is determined to fall in a range, for example, in the range of approximately 20 to 50%, more preferably, in the range of 30 to 40% of the height H3 of the air-conditioning unit 25 which will be described hereinafter. By so doing, a spacing 23 corresponding to the height H2 is formed between the flat horizontal surface 20A and 22A of the lower and upper floor panels 20 and 22. This spacing 23 between the lower and upper floor panels 20 and 22 also serves as a passage for circulating air from the air passage opening 13A in the rear base plate 13 to an intake side of the air-conditioning unit 25.

Indicated at 24 is a storage space which is provided between the sunken storage portion 20D on the lower floor panel 20 and the flat horizontal surface 22A of the upper floor panel 22 to accommodate the air-conditioning unit 25 which will be described hereinafter. In this instance, in the storage space 24, upper portions of the air-conditioning unit 25 in the sunken storage portion 20D of the lower floor panel 20 are projected above the flat horizontal surface 20A of the lower floor panel 20. Further, the projected portions of the air-conditioning unit 25 are covered under the flat horizontal surface 22A of the upper floor panel 22 which is spaced by a height H2 from the flat horizontal surface 20A of the lower floor panel 20.

Next, indicated at 25 is the air-conditioning unit which is accommodated in the sunken storage portion 20D of the lower floor panel 20 as an indoor unit. The air-conditioning unit 25 constitutes an air-conditioning system along with compressor and condenser (both not shown), i.e., the outdoor units which are mounted on the engine side. The air-conditioning unit 25 functions to condition intake air into cool air or warm air and supply conditioned air into the cab 11.

In this instance, the air-conditioning unit 25 is largely constituted by a box-like main case 26 which is positioned to extend in the transverse direction, an air fan 27 which is located in a left side section within the main case 26, an evaporator 28 which is located on the downstream side of the air fan 27 within the main case 26, a heater core 29 which is located on the downstream side of the evaporator 28, and a discharge duct 30 which is located at a downstream end of the main case 26.

Further, air filters 26A and 26B are detachably attached on circumferential and end sections in a left side section of the main case 26 to trap dust which is entrained in intake air of the air fan 27. On the other hand, the discharge duct 30 is provided with the foot side air discharge port 30A to supply cool air from the evaporator 28 or warm air from the heater core 29 to the foot side air outlet 19B on the duct cover 19, and a front side air discharge port 30B to supply cool or warm air to the forward air outlet 19C and the rearward air outlet 19D on the duct cover 19.

Further, the air-conditioning unit 25 is arranged to have a height H3 which corresponds to the depth H1 of the sunken storage portion 20D of the lower floor panel 20 plus the height or width H2 of the spacing 23 between the flat horizontal surface 20A of the lower floor panel 20 and the flat horizontal surface 22A of the upper floor panel 22.

In the case of the particular embodiment shown, the air-conditioning unit 25 is arranged such that, as soon as the air fan 27 is rotationally driven, clean air which has been taken in through the air filters 26A and 26B is conditioned by cooling at the evaporator 28 or by warming at the heater core 29. Conditioned air is then supplied to the cab 11 through the discharge duct 30, the respective air outlets 19B, 19C and 19D to keep the cab 11 at a suitable temperature.

Further, as indicated by arrows in FIGS. 3 and 4, conditioned air supplied to the cab 11 can be returned toward the air-conditioning unit 25 via the rear side of the operator's seat 16, the passage opening 13A of the rear base plate 13 and the spacing 23 between the lower and upper floor panels 20 and 22.

According to the case of the first embodiment, the hydraulic excavator 1 is arranged in the manner as described above. Following are procedures for mounting the cab 11 and the operator's seat 16 on the revolving frame 5 of the hydraulic excavator 1.

In the first place, an assembly of the rear base plate 13 and back plate 15 of the seat supporting base 12, the lower floor panel 20 and lever/pedal mount plate 21 is set on a left side section of the revolving frame 5. In the next place, the air-conditioning unit 25 is set in the sunken storage portion 20D (the storage space 24) of the lower floor panel 20, followed by piping work for the air-conditioning unit 25. At this time, since the air-conditioning unit.25 is placed on the lower floor panel 20, connections to the compressor and the condenser on the side of the engine as well as charging of a coolant can be made before mounting the cab 11.

Upon completion of the piping work for the air-conditioning unit 25, the front base plate 14, operator's seat 16 and upper floor panel 22 are successively assembled into the respective positions before setting the cab 11 on the revolving frame 5.

Now, with regard to the operation of the hydraulic excavator 1, vehicle control levers and pedals are operated by an operator who is seated on the operator's seat 16 to put the machine in travel. On the other hand, at the time of a ground excavating operation, for example, the operation control levers 17 and 18 are manipulated by the operator to put the working mechanism 4 in excavating movements.

While the working mechanism 4 is in operation, noises and heat are generated by control valves which are located under the lower floor panel 20. However, thanks to the double panel construction, having the upper floor panel 22 over the lower floor panel 20, such noises and heat are prevent from leaking into the cab 11.

Further, the height of the cab 11 can be reduced to permit transport of the hydraulic excavator 1 without dismantling the cab 11. Namely, the whole hydraulic excavator 1 including the cab 11 can be put in a transport container at the time of transporting the hydraulic excavator 1. Likewise, the whole hydraulic excavator 1 can be put in a garage.

Thus, according to the first embodiment of the present invention, the storage space 24 is provided between the sunken storage portion 20D on the lower floor panel 20 and the flat horizontal surface 22A of the upper floor panel 22.

Accordingly, the air-conditioning unit 25 can be placed in the storage space 24 in the floor panels. Thus, since there is no need for placing an air-conditioning unit in the ceiling of the cab as mentioned the prior art, it becomes possible to reduce the height of the cab 11, that is to say, to reduce the total height of the hydraulic excavator.

Consequently, the hydraulic excavator 1 can be transported easily in an extremely efficient manner because the whole hydraulic excavator 1 can be put in a transport container without dismantling the cab 11 each time when the machine is to be transported. Besides, the hydraulic excavator 1 of the present embodiment can be put in a garage in which conventional hydraulic excavators can not be put due to an oversized height.

Further, the sunken storage portion 20D of the lower floor panel 20 which constitutes part of the storage space 24 is arranged to have a depth H1 which is approximately in the range of 50 to 80% of the height H3 of the air-conditioning unit 25. Therefore, there is no possibility of interference of the lower side of the sunken storage portion 20D with the revolving frame 5 and control valves which are located under the lower floor panel 20.

Furthermore, the air-conditioning unit 25 is installed in a floor panel section in front of the operator's seat 16, so that the air-conditioning unit 25 can be connected with the compressor on the side of the engine even when the cab 11 is in a dismantled state. Besides, it is possible to charge a coolant into the air-conditioning unit. Thus, assembling work as well as maintenance of the hydraulic excavator 1 can be completed in a very facilitated manner.

Further, since the floor panel is of a double panel construction which is constituted by the lower and upper floor panels 20 and 22, it also contributes to insulate operating noises and heat of control valves which are located under the floor panel, providing a comfortable working environment within the cab 11.

On the other hand, thanks to the provision of the sunken storage portion 20D, the lower floor panel 20 is formed into a stereostructure which is enhanced in rigidity, in addition to the effects of suppressing resonance of the lower floor panel 20.

Furthermore, the flat horizontal surface 20A, bent end walls 20B and 20C and sunken storage portion 20D of the lower floor panel 20 are formed on one and single plate material and provided as one integral structure. That is to say, the lower floor panel 20 is constituted by a minimum number of parts and can contribute to improve productivity to a significant degree.

Moreover, the upper floor panel 22 is attached to the lower floor panel 20 simply by means of bolts or the like. Therefore, after opening the cab door 11E and removing bolts and lifting, the upper floor panel 22, the air filters 26A and 26B on the main case 26 can be attached or detached for replacement or for cleaning purposes.

Figure 7:
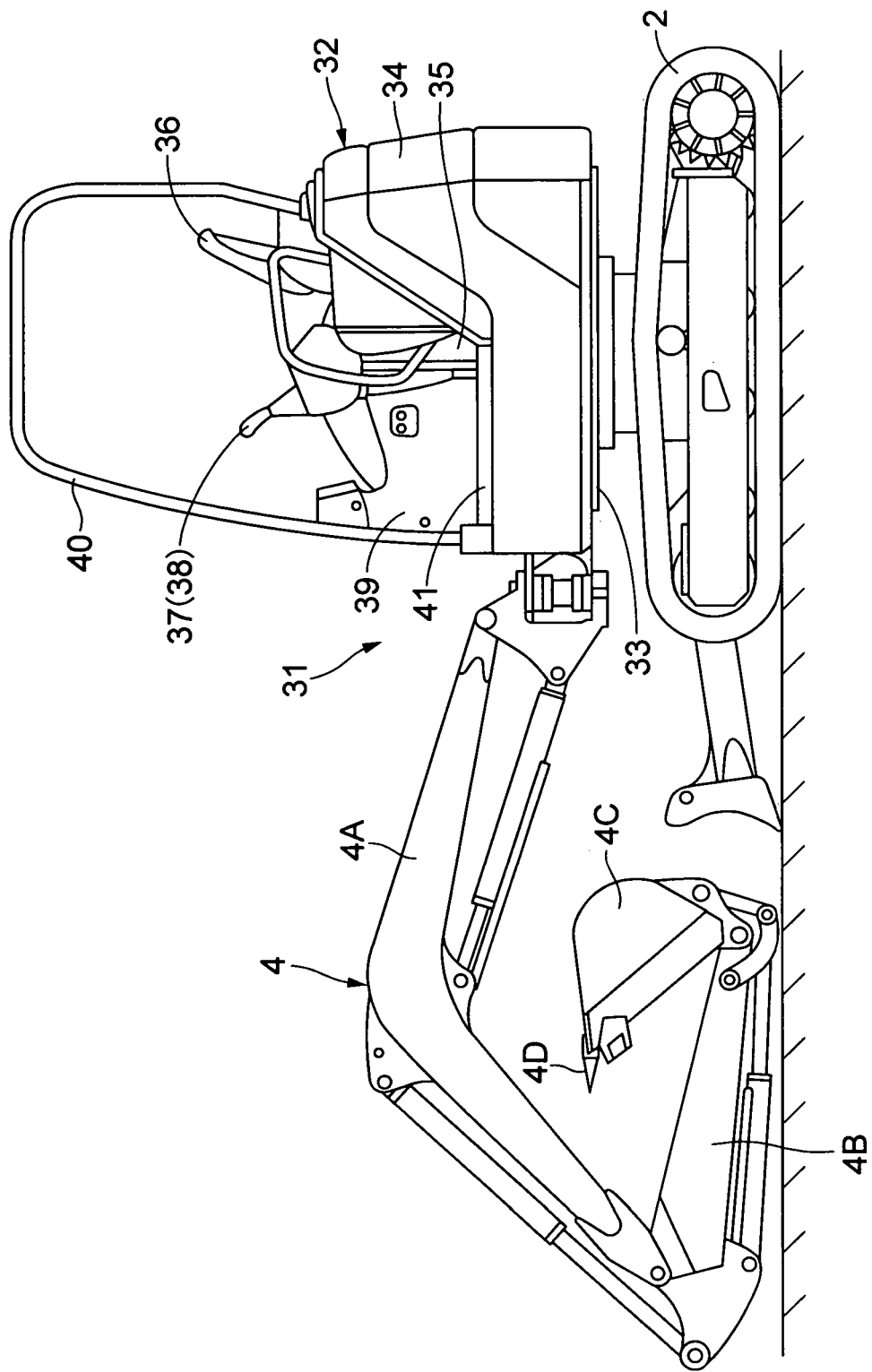
FIG. 7 is a front view of a canopy-furnished type hydraulic excavator to which a second embodiment of the present invention is applied.
Figure 8:
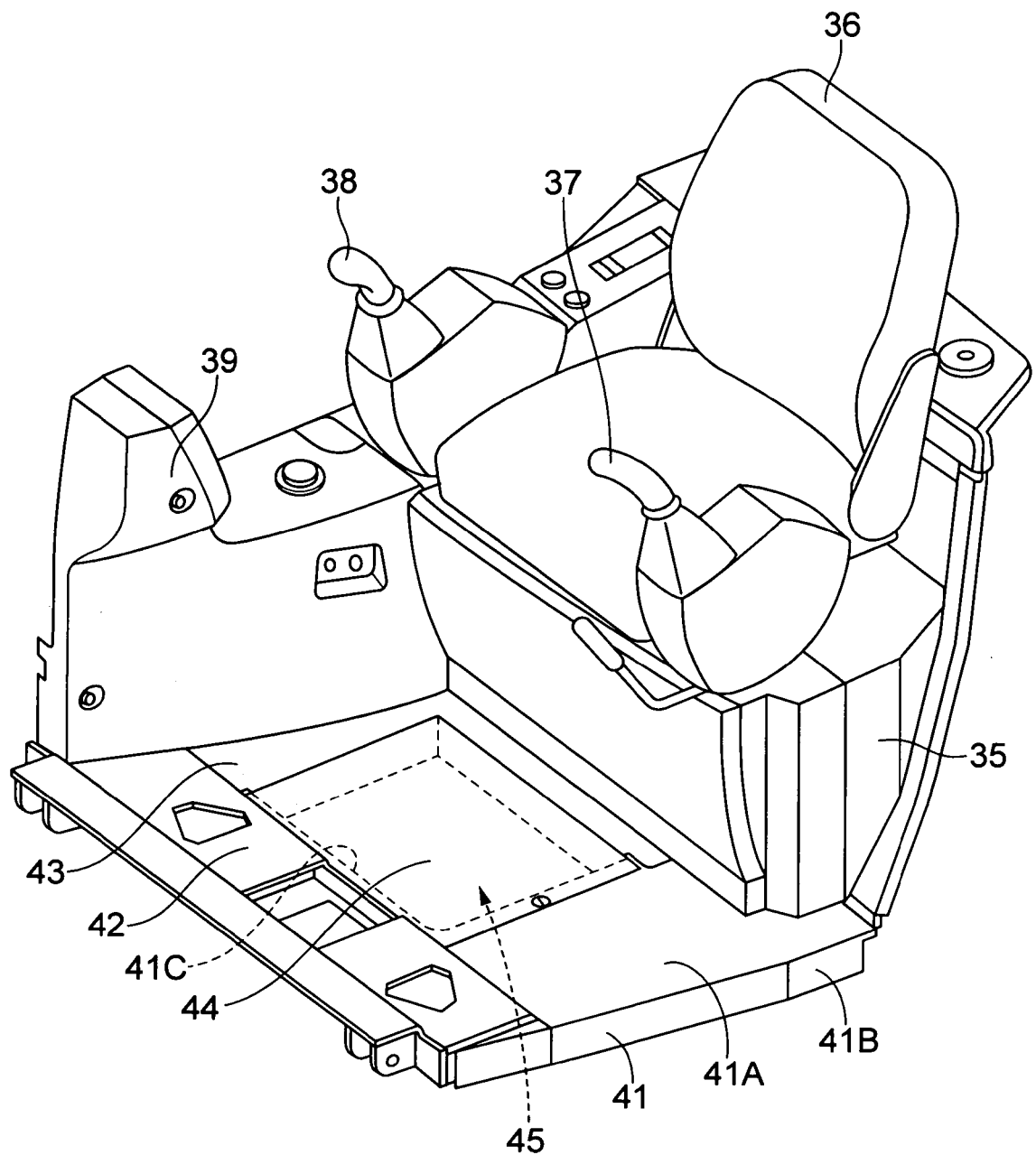
FIG. 8 is a perspective view of an operator's seat under a canopy, showing layouts of equipments around the operator's seat and a storage space in a floor panel.
Figure 9:
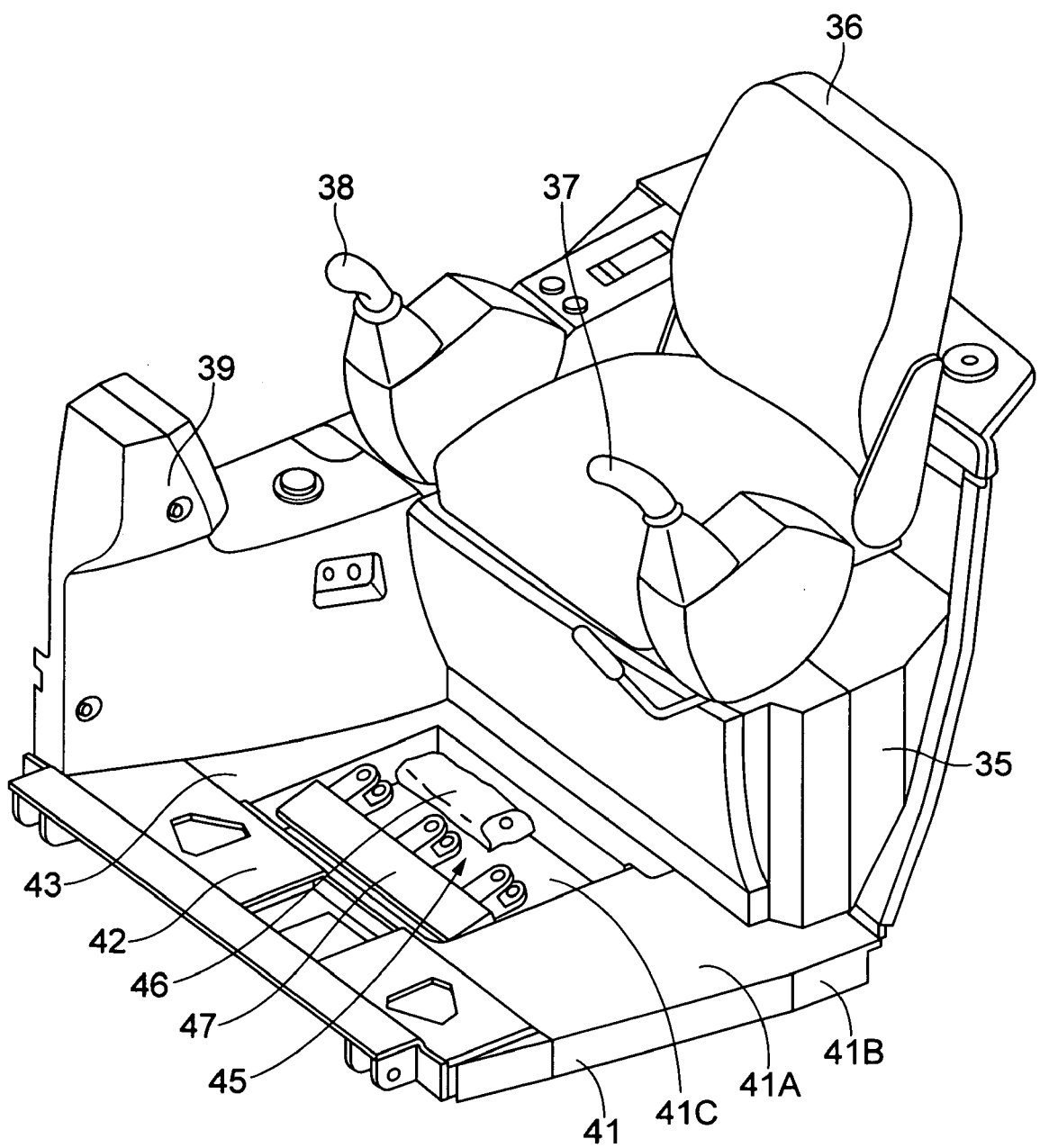
FIG. 9 is a perspective view similar to FIG. 8 except that an upper floor panel is removed.

Now, turning to FIGS. 7 to 9, there is shown a second embodiment of the present invention. In this embodiment, the present invention is applied to a canopy type hydraulic excavator having a canopy to spread over an operator's seat as a construction machine. The second embodiment has features in that a sunken storage portion in a lower floor panel is adapted to store tools which are required for various jobs. In the following description of the second embodiment, those component parts which are identical with counterparts in the foregoing first embodiment are simply designated by the same reference numerals or characters to avoid repetitions of same explanations.

In FIG. 7, indicated at 31 is a canopy-furnished type hydraulic excavator adopted in the second embodiment as another typical example of the construction machine to which the present invention is applicable. The hydraulic excavator 31 is provided with an upper revolving structure 32 which is largely constituted by a revolving frame 33, a decorative cover 34 which is arranged to cover an engine and other components, an operator's seat 36 which is provided on a seat supporting base 35, operation control levers 37 and 38 which are provided at the left and right sides of the operator's seat 36, a duct cover 39 which is extended from the right side to the front side of the operator's seat 36, a canopy 40 which spread over the operator's seat 36, and lower and upper floor panels 41 and 44.

Denoted at 41 is a lower floor panel which is provided on the front side of the operator's seat 36 in the second embodiment. As shown in FIGS. 8 and 9, along with an upper floor panel 44 which will be described hereinafter, the lower floor panel 41 makes up a floor panel of a double panel construction. A lever/pedal mount plate 42 is securely fixed to the front end of the lower floor panel 41. The lower floor panel 41 is provided with a flat horizontal surface 41A, left and right bent end walls 41B (a left bent end wall 41B alone is shown in the drawings), and a sunken storage portion 41C. Similarly to the lower floor panel 20 in the foregoing first embodiment, the lower floor panel 41 is formed out of a single plate material as one integral structure.

However, in this case, a limiter plate 43 is attached on the flat horizontal surface 41A of the lower floor panel 41 to limit the range or boundaries of the opening of the sunken storage portion 41C to predetermined positions on the front side of the seat supporting base 35 and on the left side of the duct cover 39. The limiter plate 43 serves to prevent on-vehicle tools 46 and flat claws 47 which is stored in a storage space 45 from getting into inaccessibly deep portions of the storage space 45 which will be described hereinafter.

Indicated at 44 is an upper floor panel which is provided over the lower floor panel 41. In this case, the upper floor panel 44 consists of a flat rectangular plate which covers the sunken storage portion 41C. The upper floor panel 44 is engaged with the limiter plate 43 at its right end, and detachably attached to the top side of the lower floor panel 41 at its left end by means of a grip-like member, a bolt or the like.

Designated at 45 is a storage space which is provided between the sunken storage portion 41C of the lower floor panel 41 and the upper floor panel 44. In this case, the storage space 45 is arranged to store the working tools like on-vehicle tools 46 and flat claws 47 as described below.

Namely, indicated at 46 are on-vehicle tools such as spanners or wrenches and screw drivers which are stored in the sunken storage portion 41C of the lower floor panel 41. Indicated at 47 are flat claws to be attached to the fore end of the bucket 4C of the working mechanism 4 in place of the excavating claws 4D. That is to say, the flat claws 47 are a substitute tool to be used, for example, at the time of leveling ground surfaces. These on-vehicle tools 46 and flat claws 47 are shown as the working tools which are needed for maintenance and service and for a ground leveling work or the like.

Thus, according to the second embodiment of the invention, it becomes possible even for a small-size hydraulic excavator 31 to store substitute working tools like the on-vehicle tools 46 and flat claws 47 in the storage space 45 in the floor panel to facilitate maintenance work as well as replacements of working tools.

Now, turning to FIGS. 10 to 13, there is shown a third embodiment of the present invention. This embodiment has features in that a lower floor panel is composed of a lower floor panel member with a case receptacle opening in a flat horizontal surface and a case or tray member to be set in the case receptacle opening of the floor panel member which form a sunken storage portion separately from the lower floor panel member. In the following description of the third embodiment, those component parts which are identical with counterparts in the foregoing first embodiment are simply designated by the same reference numerals or characters to avoid repetitions of same explanations.

Figure 10:
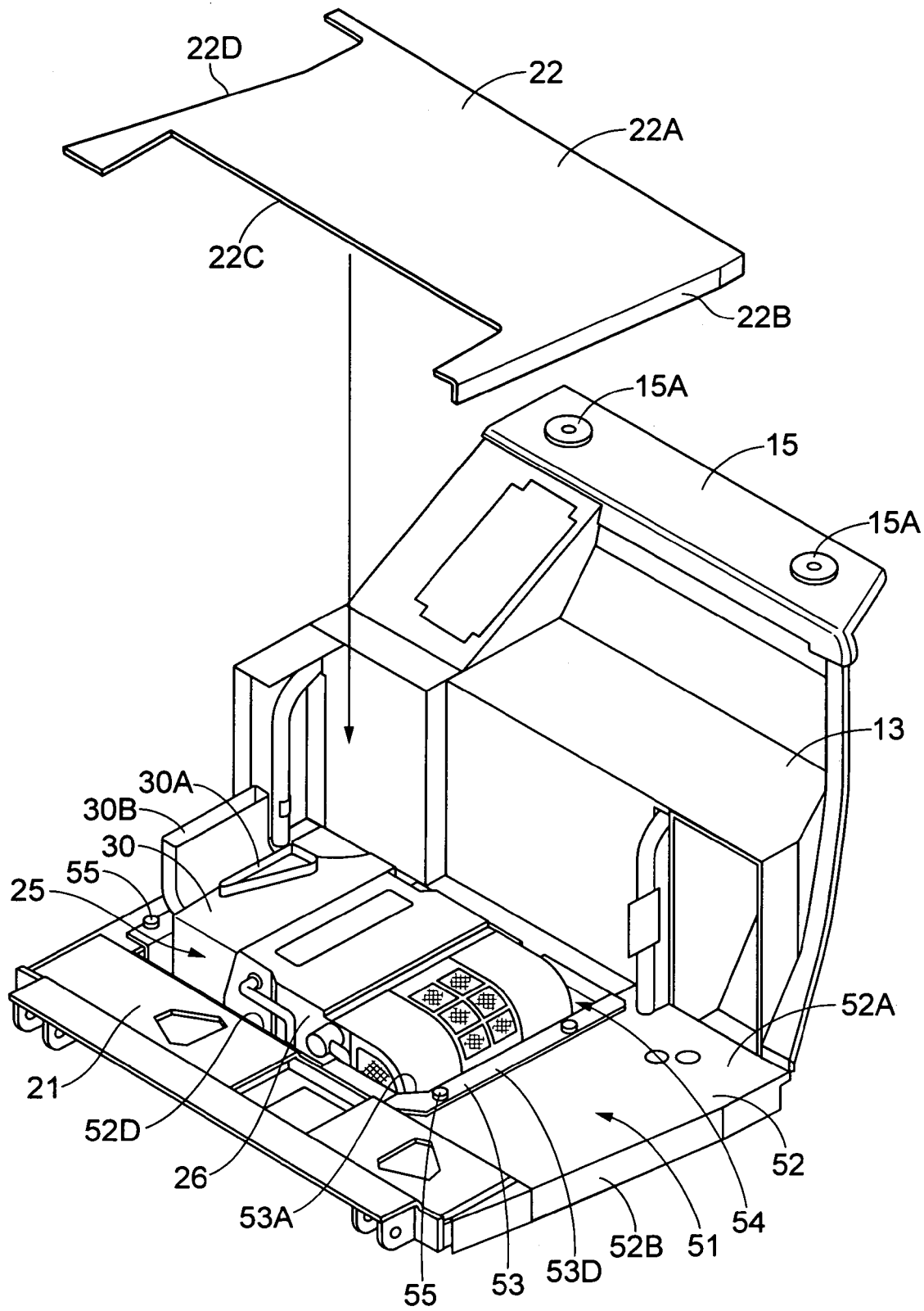
FIG. 10 is a perspective view of an air-conditioning unit container case member which is set in a lower floor panel according to a third embodiment of the present invention.

In FIG. 10, indicated at 51 is a lower floor panel which is adopted in the third embodiment in place of the lower floor panel 20 of the first embodiment. In this case, the lower floor panel 51 is also arranged to make up a floor panel of a double panel construction along with an upper floor panel 22, and to form a lower layer of the double panel construction. As described in greater detail hereinafter, the lower floor panel 51 is composed of a lower floor panel member 52 and an air-conditioning unit case member 53 or a tool case member 56 which is formed separately from the floor panel member 52 to be selectively set in the lower floor panel member 52.

Figure 11:
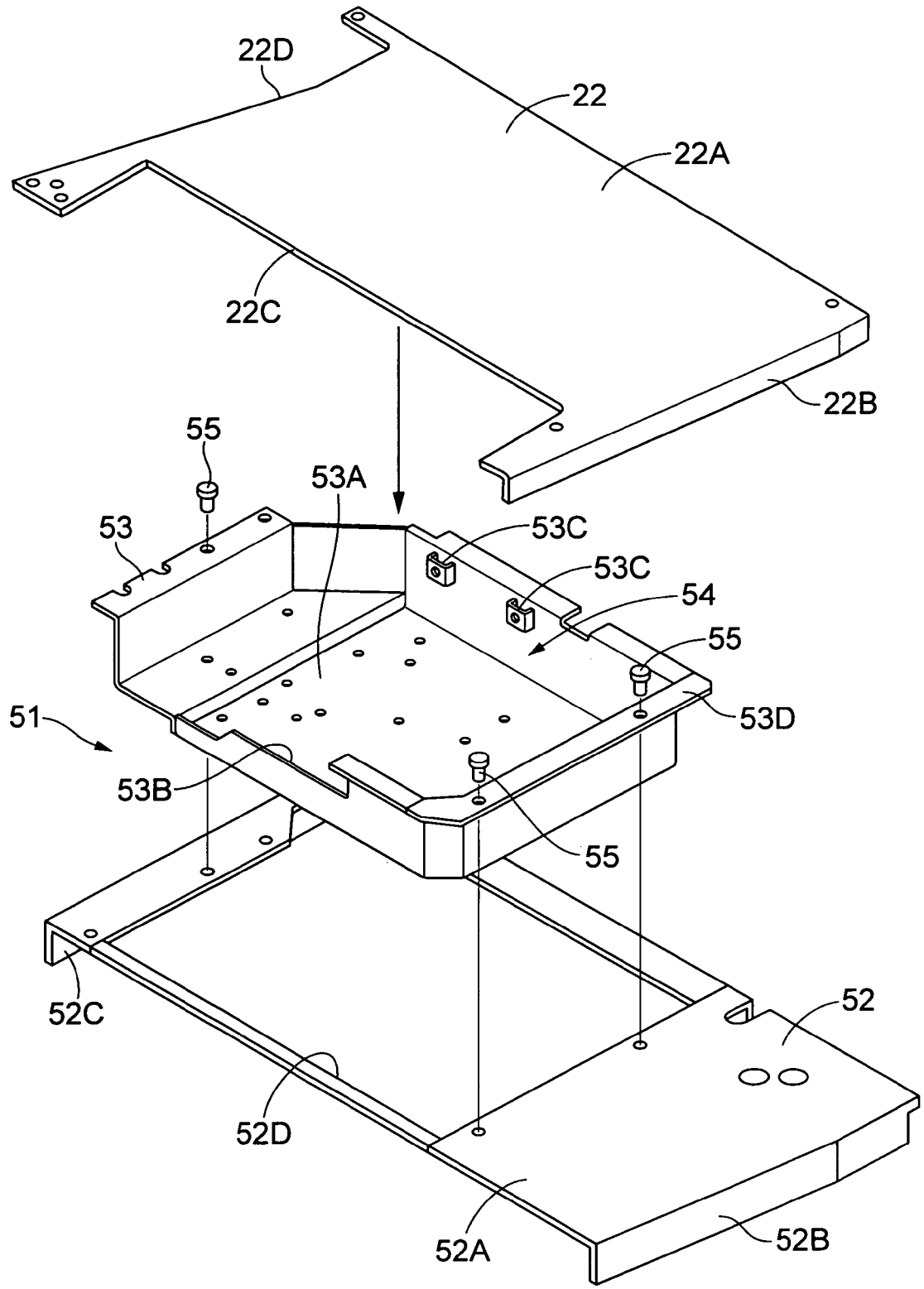
FIG. 11 is an exploded perspective view showing a floor panel member of the lower floor panel, air-conditioning unit case member and upper floor panel of FIG. 10 in a separated state.

Denoted at 52 is the lower floor panel member which is adopted as a base of the lower floor panel 51. As shown in FIG. 11, the lower floor panel member 52 is largely constituted by a rectangular flat horizontal surface 52A which is extended in transverse direction, left and right bent wall sections 52B and 52C which are formed by downwardly bending opposite end portions of the flat horizontal surface 52A at right angles, and a rectangular case receptacle opening 52D which is widely opened centrally of the flat horizontal surface 52A. As seen in FIG. 10, rear end of the lower floor panel member 52 is securely fixed to front end of the rear base plate 13 by the use of bolts or by welding or other suitable fixation means. A lever/pedal mount plate 21 is fixed to front end of the lower floor panel member 52.

Figure 12:
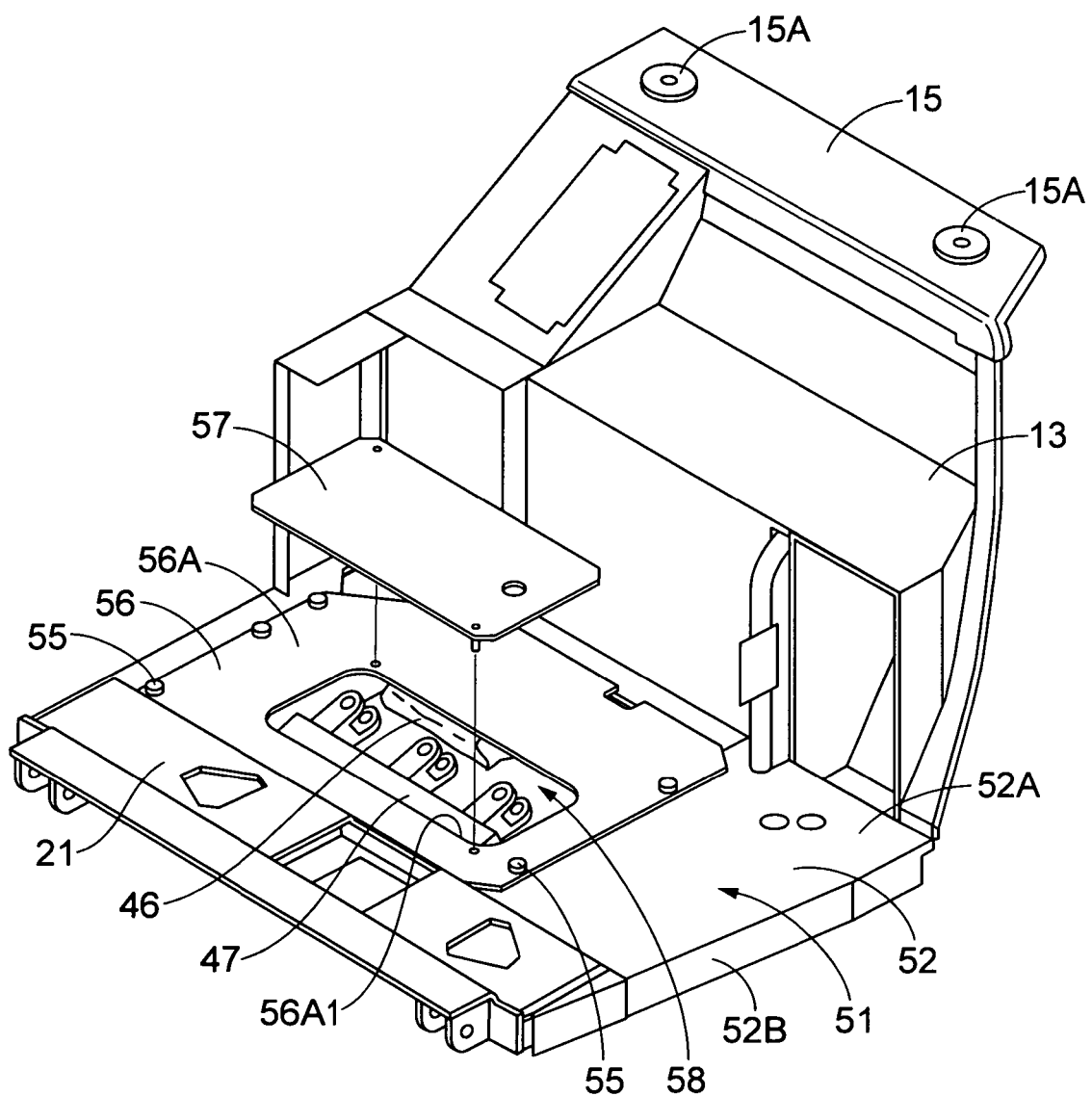
FIG. 12 is a perspective view of a tool container case member which is set in a lower floor panel according to the third embodiment of the present invention.

In this instance, as shown in FIG. 10, for installing an air-conditioning unit 25, an air-conditioning unit case member 53 is set in the case receptacle opening 52D in the lower floor panel member 52 in the manner as described hereinafter. On the other hand, in case it is desired to store the respective tools like the on-vehicle tools 46 and flat claws 47 in the floor panel, a tool case member 56 is set in the case receptacle opening 52D of the lower floor panel member 52 as shown in FIG. 12. Namely, the air-conditioning unit 25 is installed in a storage space 54 and the on-vehicle tools 46 and the flat claws 47 are stored in a storage space 58 as described hereinafter. Therefore, the air-conditioning unit case member 53 or the tool case member 56 is selectively set in the case receptacle opening 52D of the lower floor panel member 52.

Further, in this case, when the case members 53 and 56 are removed from the case receptacle opening 52D, control valves, revolving mechanism and center joint (all not shown in the drawings) under the floor panel can be exposed through the case receptacle opening 52D, so that one can carry out inspections or maintenance and service on these component parts in an open state.

The above-mentioned air-conditioning unit case member 53 and tool case member 56, which are selectively set in the lower floor panel member 52, are each arranged in the manner as described below.

Firstly, indicated at 53 is the air-conditioning unit case member which is set in the lower floor panel member 52 in case the air-conditioning unit 25 is installed in the storage space 54. The air-conditioning unit case member 53 is formed separately from the lower floor panel member 52. The air-conditioning unit case member 53 is arranged to provide a sunken storage portion 53A beneath the flat horizontal surface 52A when set in the case receptacle opening 52D of the lower floor panel member 52.

In this instance, the sunken storage portion 53A is in a rectangular bottomed box-like shape and extended in the transverse direction to form part of a storage space 54. Further, the sunken storage portion 53A of the air-conditioning unit case member 53 is formed in a stepped shape conforming with the shape of the air-conditioning unit 25, and provided with a notched portion 53B at a front side as a passage of pipes and cables. Brackets 53C are provided at the back side of the air-conditioning unit case member 53 for fixing part of the air-conditioning unit 25 or for fixing subsidiary parts (not shown) of the air-conditioning unit 25. Furthermore, hanger flanges 53D are provided along upper edges of the air-conditioning unit case member 53 for engagement with the top side of the flat horizontal surface 52A of the lower floor panel member 52.

In this manner, the sunken storage portion 53A of the air-conditioning unit case member 53 particularly arranged to suit the shape of the air-conditioning unit 25 and to provide a passage of pipes and cables to and from the air-conditioning unit 25. Accordingly, the air-conditioning unit 25 can be placed in the sunken storage portion 53A in a stabilized state, and thus can be installed accurately in an extremely facilitated manner. In addition, the air-conditioning unit case member 53, which is formed separately from the lower floor panel member 52, can be easily formed into a matching shape particular to the air-conditioning unit 25. Further, at the hanger flanges 53D, the air-conditioning unit case member 53 is detachably fixed to the lower floor panel member 52 by means of bolts 55 which will be described below.

Indicated at 54 is the storage space which is provided between the sunken storage portion 53A of the air-conditioning unit case member 53 and the upper floor panel 22. Similarly to the storage space 24 in the foregoing first embodiment, the storage space 54 is particularly arranged to accommodate the air-conditioning unit 25.

Indicated at 55 are a plural number of bolts which are employed for detachably fixing the air-conditioning unit case member 53 to the lower floor panel member 52. These bolts 55 are threaded into the lower floor panel member 52 through the hanger flanges 53D of the air-conditioning unit case member 53. Accordingly, at the time of inspection or maintenance and service of control valves, revolving mechanism and center joint which are located under the floor panel, the air-conditioning unit case member 53 can be easily removed from the lower floor panel member 52 by loosening the bolts 55.

Designated at 56 is a tool case member (see FIG. 12) to be set in the lower floor panel member 52 at the time of storing working tools like the on-vehicle tools 46 and flat claws 47 in a storage space 58 as described below. Similarly to the air-conditioning unit case member 53, the tool case member 56 is formed separately from the lower floor panel member 52. The tool case member 56 is constituted by a frame portion 56A which is attached to the lower floor panel member 52 and provided with an opening 56A1 for access to the inside of the tool case member 56, and a sunken storage portion 56B which is attached to the lower side of the frame portion 56A in communication with the opening 56A1.

Figure 13:
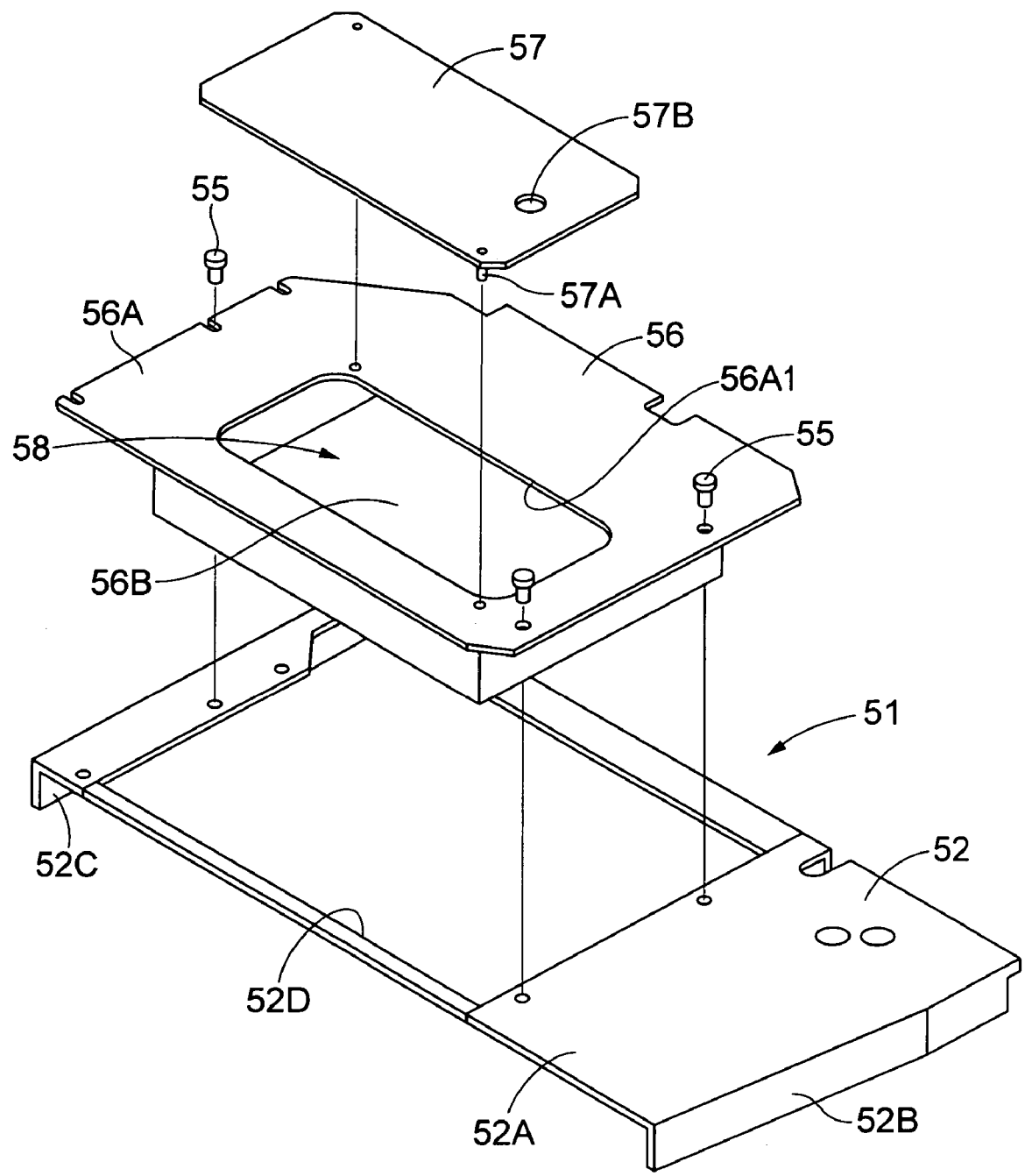
FIG. 13 is an exploded perspective view showing a floor panel member of the lower floor panel, tool case member and upper floor panel of FIG. 12 in a separated state.

In this instance, the sunken storage portion 56B is so arranged as to form a sunken storage space under the flat horizontal surface 52A when the tool case member 56 is set in the case receptacle opening 52D of the lower floor panel member 52. More particularly, the sunken storage portion 56B is formed in a rectangular, bottomed box-like shape which is extended transversely of the floor panel as shown in FIG. 13 to define a part of the storage space 58 which will be described hereinafter. The sunken storage portion 56B is integrally fixed to the lower side of the frame portion 56A, for example, by welding or by the use of other fixation means. Similarly to the air-conditioning case member 53, the tool case member 56 is detachably attached to the lower floor panel member 52 by the plural number of bolts 55.

Indicated at 57 is an upper floor panel which is provided on the upper side of the tool case member 56 which is set in the lower floor panel member 52 of the lower floor panel 51. More particularly, the upper floor panel 57 is in the form of a flat rectangular plate which is arranged to serve as a lid for opening and closing the opening 56A1 over the sunken storage portion 56B. The upper floor panel 57 is removably set in position on the frame portion 56A of the tool case member 56 by way of a couple of positioning pins 57A (only one pin is shown in the drawing) which are adapted to fit in the frame portion 56A of the tool case member 56. Further, the upper floor panel 57 is provided with a finger hole 57B in which one can put a finger at the time of setting or removing the upper floor panel 57.

Indicated at 58 is a storage space which is provided between the sunken storage portion 56B of the tool case member 56 and the upper floor panel 57. In this case, the storage space 58 is particularly arranged to store working tools like the on-vehicle tools 46 and flat claws 47.

Thus, the third embodiment of the invention, which is arranged in the manner as described above, can produce substantially the same effects as in each one of the foregoing embodiments. Especially in the case of the third embodiment, the lower floor panel 51 is arranged to set either the air-conditioning unit case member 53 or the tool case member 56 in the case receptacle opening 52D in the lower floor panel member 52. The use of the stereostructure case members 53 and 56 which can be easy to fabricate is reflected by higher productivity and lower production cost.

When the air-conditioning unit case member 53 is set in the lower floor panel member 52, the air-conditioning unit 25 can be smoothly and stably set in the air-conditioning unit case member 53 which is customized particularly to the shape of the air-conditioning unit 25, taking into consideration convenience of pipe and cable connections. That is to say, the air-conditioning unit 25 can be assembled and installed in the floor panel easily in an efficient and reliable manner.

On the other hand, when the tool case member 56 which is used to store the working tools like the on-vehicle tools 46 and flat claws 47 suffices to be of a simple box-like shape, which will lead to improvements in productivity and reductions in production cost. Besides, the box-like tool case member 56 contributes to expand the storage space 58, that is to say, to increase the capacity of the storage space 58.

The lower floor panel 51, which is arranged to receive either the air-conditioning unit case member 53 or the tool case member 56 selectively in the case receptacle opening 52D in the lower floor panel member 52, can be applied to cab-furnished type hydraulic excavators as well as canopy type hydraulic excavators.

Further, the air-conditioning unit case member 53 or the tool case member 56 which is detachably set in the lower floor panel member 52 simply by means of bolts 55, so that it can be installed or uninstalled in an extremely facilitated manner. In addition, through the case receptacle opening 52D in the lower floor panel member 52 which is uncovered upon removing the air-conditioning unit case member 53 or the tool case member 56, one can easily access to control valves, revolving mechanism and center joint which are located beneath the floor panel, and carry out an inspection or maintenance work in a convenient and efficient manner.

In the foregoing first embodiment, the floor panel is arranged to provide a storage space 24 between the sunken storage portion 20D of the lower floor panel 20 and the flat horizontal surface 22A of the upper floor panel 22, and the storage space 24 is particularly arranged to suit installation of the air-conditioning unit 25 which is indoor unit.

However, the present invention is not restricted to the particular arrangements shown. For instance, in a case of a hydraulic excavator which is not providing with an air-conditioning unit, the storage space 24 between the upper and lower floor panels 20 and 22 may be utilized to store the on-vehicle tools 46 and flat claws 47 in the manner as in the second embodiment instead of the air-conditioning unit 25. In such a case, the storage space 24 according to the first embodiment can accommodate larger articles or a greater number of articles as compared with the storage space 45 according to the second embodiment.

Moreover, in the foregoing embodiments, the present invention has been applied by way of example to hydraulic excavator 1 and 31 typical of construction machines. However, it is to be understood that the present invention is not restricted to the particular examples shown. Namely, the present invention can be similarly applied to other construction machines such as hydraulic cranes and bulldozers.

The invention claimed is:

1. A construction machine having, an automotive lower structure, an upper revolving structure which is rotatably mounted on and assembled to said automotive lower structure by a revolving frame, a working mechanism mounted for lifting on a front side of said revolving frame of said upper revolving structure for excavating operations, and, an operator's seat provided on said upper revolving structure, on which an operator is to be seated, a cab located so as to cover said operator's seat, and a floor panel located in front of said operator's seat, characterized in that:

said floor panel is fabricated in a double panel construction composed of a lower floor panel having a flat horizontal surface and a sunken storage portion in a part of said flat horizontal surface, said sunken storage portion being positioned above said revolving frame so as to be out of contact therewith, and an upper floor panel located over said lower floor panel so as to cover said sunken storage portion;

a storage space is provided between said sunken storage portion of said lower floor panel and said upper floor panel; and an air conditioning unit, which supplies conditioned air, is accommodated in said storage space.

2. A construction machine as defined in claim 1, wherein said air-conditioning unit is installed in said storage space with upper portions of said air-conditioning unit projected above said flat horizontal surface of said lower floor panel and said upper floor panel is vertically spaced above said flat horizontal surface of said lower floor panel a distance sufficient to cover the projected portion of said air-conditioning unit.

3. A construction machine as defined in claim 1, wherein said flat horizontal surface and sunken storage portion of said lower floor panel are integrally formed of a single plate material.

4. A construction machine as defined in claim 1, wherein said lower floor panel is composed of a lower floor panel member having a case receptacle opening, and a case member formed separately from said lower floor panel member and adapted to fit in said case receptacle opening to form a sunken storage portion in said lower floor panel member.

5. A construction machine as defined in claim 4, wherein said case member of said lower floor panel is detachably attached to said lower floor panel member whereby said case member may be removed from said lower floor panel member to permit access through said case receptacle opening to equipment located under said lower floor panel member for inspection or maintenance and service thereof.

\* \* \* \* \*